Figure 1:
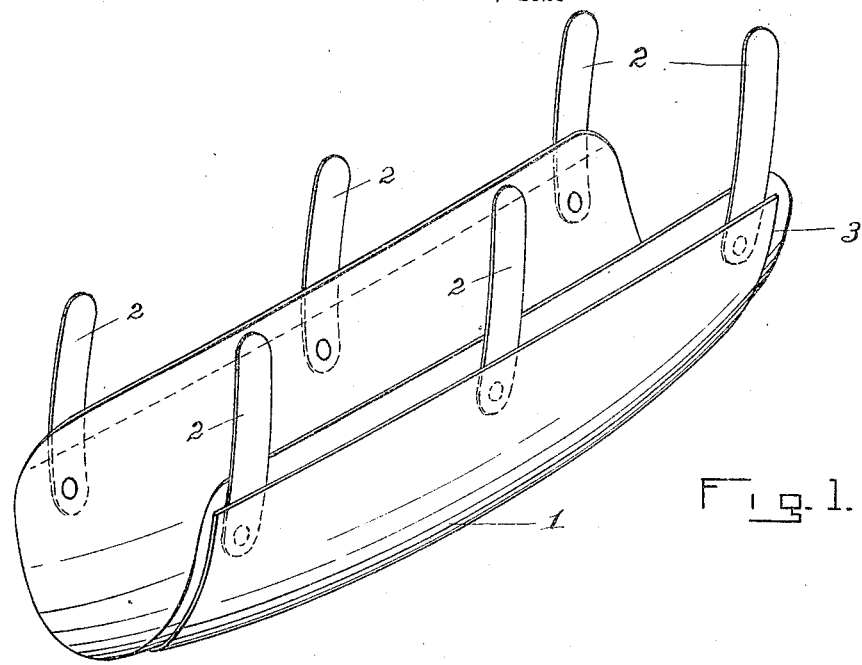

June 1, 1926.

O. WOOD

BLOW-OUT PATCH

Filed Sept. 17, 1925

1,587,457

Inventor:
Omer Wood,
By Frank C. Curtis
Attorney.

Patented June 1, 1926.

1,587,457

UNITED STATES PATENT OFFICE.

OMER WOOD, OF SCHENECTADY, NEW YORK, ASSIGNOR TO WOOD BROTHERS, OF SCHENECTADY, NEW YORK, A FIRM CONSISTING OF OMER WOOD AND DANIEL J. WOOD.

BLOW-OUT PATCH.

Application filed September 17, 1925. Serial No. 56,839.

Reference may be had to the accompanying drawings, and the reference characters marked thereon, which form a part of this specification. Similar characters refer to similar parts in the several figures therein.

The principal object of the invention is to secure against displacement, a blowout patch inserted in an automobile tire.

Other objects will appear in connection with the following description.

Fig. 1 of the drawings is a view in perspective of a blowout patch embodying my invention.

Figure 2:
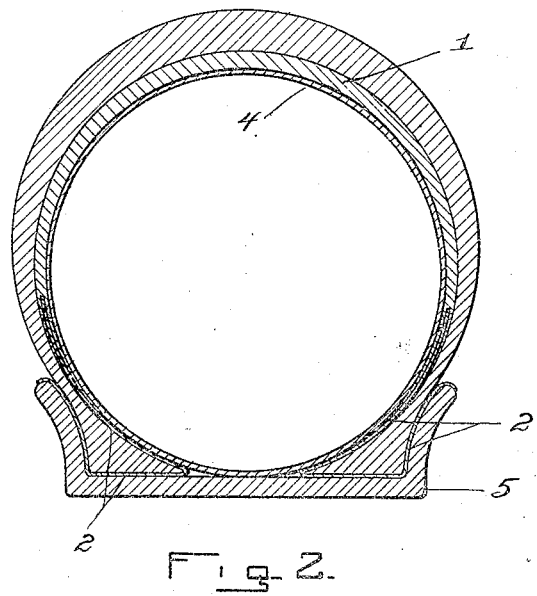

Fig. 2 is a cross-section of the same enclosed in a pneumatic tire mounted on a wheel-rim.

Referring to the drawings wherein the invention is shown in preferred form, 1 is the body of the blowout patch which is made up of sheets of canvas or similar fabric vulcanized together in the usual manner.

The patch is of such cross-sectional form as to approximately fit within the tire, and when secured in proper position to cover, and prevent a blowout at, a break or point of weakness in the tire.

Blowout patches have heretofore been provided with rigid or resilient hooks along the side edges of the patch adapted to engage the edges of the tire to hold the patch in position; but in the use of such patches it is found that there is so much variation in the internal dimensions of the tire and in the form and size of the edges of the tire that the hooks cannot be relied upon to hold the patch in position.

In carrying out my invention, I attach to the patch along its opposite sides a plurality of straps, 2, of pliable metal which can readily be bent around the edges of the tire after the patch has been properly seated within the tire.

These straps may be made of any pliable metal; but I prefer to make them of sheet copper which has both the pliability and the tensile strength to accomplish the objects of the invention.

The straps, 2, may be attached or secured to the body of the patch in any known manner.

I have shown the straps riveted at their inner ends to the body of the patch.

In Fig. 1 I have shown an external ply, 3, added to the patch to cover the heads of the rivets whereby the straps, 2, are secured to the body of the patch. This may be omitted when it is not desired to use the same.

The patch is inserted within the tire and seated over the point of weakness therein and the straps, 2, are bent around the respective edges of the tire.

The inner tube, 4, is then inserted within the tire, and the tire mounted upon the rim, 5, of a vehicle wheel.

The straps being pliable can be readily bent by hand without the use of tools; and due to their pliability they are free to yield to the pressure of the tire as it is inflated and be drawn tightly around the edges of the tire and between said edges and the rim.

The patch is thus caused to fit properly within the tire, and the straps to fit properly around the edges of the tire regardless of variations in dimensions of the interior and edges of the tire which would prevent proper fitting of a patch provided with rigid or resilient hooks along its edges.

I do not wish to be limited to the constructions shown and above described, as, for certain purposes of the invention, various changes may be made in the form and arrangement of various parts of the device without departing from the spirit of the invention.

What I claim as new and desire to secure by Letters Patent is—

A blowout patch having projecting from its opposite sides a plurality of straps of pliable sheet metal readily bendable around the edges of an enclosing tire.

In testimony whereof, I have hereunto set my hand this 11th day of September, 1925.

OMER WOOD.